Patented Aug. 8, 1950

2,518,160

UNITED STATES PATENT OFFICE 2,518,160

CURING OF HYDROCARBON-SUBSTITUTED POLYSILOXANE RESINS WITH BENZYL TRIMETHYL AMMONIUM BUTOXIDE

Kenneth N. Mathes, Schenectady, N. Y., assignor to General Electric Company, a corporation of New York No Drawing. Application September 18, 1947, Serial No. 774,893

3 Claims. (Cl. 260—46.5)

This invention is concerned with curable hydrocarbon-substituted polysiloxane resinous compositions. More particularly the invention relates to a composition of matter comprising (1) a resinous condensation product containing a plurality of hydrocarbon-substituted silicon atoms linked by oxygen, the average number of hydrocarbon groups attached to silicon atoms being more than 1 and less than 2 per silicon atom, and (2) from 0.05 to 5 per cent, by weight, based on the weight of (1) of a cure accelerator for (1) comprising a compound corresponding to the general formula $(R)_4N-OR'$ where R is a member selected from the class consisting of hydrocarbon radicals and hydroxy-substituted hydrocarbon radicals and R' is a member selected from the class consisting of hydrogen, hydrocarbon radicals and acyl radicals.

Thus R in the above formula may be alkyl, e. g., methyl, ethyl, propyl, isopropyl, amyl, etc.; aryl, e. g., phenyl, naphthyl, etc.; alkaryl, e. g., tolyl, xylyl, etc.; aralkyl, e. g., benzyl, phenylethyl, etc.; hydroxy-substituted hydrocarbon radicals, e. g., hydroxyethyl, hydroxypropyl, hydroxyphenyl, etc.; unsaturated aliphatic radicals, e. g., vinyl, allyl, etc. R', in addition to being hydrogen and the hydrocarbon radicals disclosed for R, may also be the formyl, acetyl, propionyl, etc., radicals.

One of the difficulties in handling resinous hydrocarbon-substituted polysiloxanes involves the extensive times and elevated temperatures required to effect conversion of the liquid, soluble, fusible resins to the solid, infusible, insoluble state. For example, a fusible, soluble, liquid methyl- and phenyl-substituted polysiloxane resin containing an average of from 1 to 1.8 total methyl and phenyl groups per silicon atom is converted to the solid, infusible and insoluble state only by heating it for about 48 hours at 200° C.

I have now discovered that liquid, soluble polysiloxane resinous compositions may be cured at lower temperatures and in shorter periods of time by incorporating in the said resinous composition small amounts of either organic quaternary ammonium bases or derivatives of organic quaternary bases corresponding to the general formula disclosed in the first paragraph of the description of this invention.

Examples of resins which can be cured by means of my invention are more particularly described and claimed in Rochow Patents 2,258,218–222, issued October 7, 1941, and assigned to the same assignee as the present invention. These resins may be prepared by hydrolysis and condensation of hydrocarbon-substituted halogenosilanes or mixtures of hydrocarbon-substituted halogenosilanes (which may also contain varying amounts of a silicon tetrahalide) containing the required average number of hydrocarbon groups attached to silicon. The cure accelerators employed in the practice of my invention are particularly applicable to resinous hydrocarbon-substituted polysiloxanes containing an average of from 1 to 2, preferably from 1.3 to 1.8, hydrocarbon groups per silicon atom.

Although the cure accelerators may be added to the resinous polysiloxanes in varying amounts, I have found that good results are obtained when the per cent, by weight, of the cure accelerator, based on the weight of the resinous polysiloxane, ranges from 0.05 to 5 per cent, preferably from 0.1 to 3 per cent. Although amounts in excess of 5 per cent may be employed, no particular advantage is obtained thereby.

The manner in which my invention may be practiced may be varied within wide limits. Thus, I may add the cure accelerator to the resinous polysiloxane prior to the intended use. In some cases where it is desired to effect a more intimate dispersion of the cure accelerator, it may be desirable to dissolve the cure accelerator in a small amount of a solvent which is miscible with the particular polysiloxane resin. From 20 to 75 per cent, by weight, solutions of the cure accelerators in the chosen solvent have been found desirable. Among the solvents which I have found useful for this purpose may be mentioned, for instance, acetone, tetrahydrofuran, methyl alcohol, ethyl alcohol, ethers of ethylene glycol, for example, monoethyl ether of ethylene glycol, monobutyl ether of ethylene glycol, dibutyl ether of ethylene glycol, etc.; ethers of diethylene glycol, for example, monobutyl ether of ethylene glycol, etc. I have found that, unexpectedly, good results are obtained when the cure accelerator is first dissolved in a small amount of tetrahydrofuran prior to addition of the cure accelerator to the resinous polysiloxane.

It will, of course, be apparent to those skilled in the art that various temperature ranges and times of heating may be employed in effecting the conversion of the polysiloxane resins to the substantially infusible and insoluble state. Such conditions are dependent on several factors including, for example, the type of cure accelerator employed, the proportion of cure accelerator, the particular resinous polysiloxane, etc.

In order that those skilled in the art may better understand how the present invention may be practiced, the following examples are given by way of illustration and not by way of limitation.

Example 1

In this example, a methyl- and phenyl-substituted polysiloxane resin was prepared by cohydrolyzing a mixture consisting, by weight, of 8 per cent methyltrichlorosilane, 23 per cent phenyltrichlorosilane, 28 per cent dimethyldichlorosilane, and 41 per cent diphenyldichlorosilane to yield a liquid resinous hydrocarbon product containing an average of from about 1.3 to 1.5 total methyl and phenyl groups per silicon atom. The isolated resin was washed with water, dried, and dissolved in toluene to form a solution having 80 per cent solids. To this resin was added varying amounts of tetraethanol ammonium hydroxide in the form of an alcohol-water solution. The cure accelerator was dispersed throughout the resin, and thereafter glass fiber tape was dipped in this resinous solution and subjected to different temperature conditions for varying periods of time. The following are the results of these treatments:

| Per Cent Cure Accelerator | Temperature | Length of Heating | Remarks |
| --- | --- | --- | --- |
|  | °C. |  |  |
| 1% | 135 | 15 minutes | Tack-free when hot. |
| 0.1% | 135 | 3 hours | Do. |
| 0% | 240 | 16 hours | Still tacky when hot. |

When samples of resin containing 0.1 per cent, by weight, of the cure accelerator were allowed to stand at 25° C. and 65° C., it was found that the resin gelled in 26 days and 16 hours, respectively.

When 0.1 per cent, by weight, tetraethanol ammonium hydroxide was added to the above-identified methyl- and phenyl-substituted polysiloxane resin solution and 3-mil glass tape was dipped in the said resin and baked for 50 minutes at 100° C., tests showed that the dielectric strength of the glass tape was equal to 990 volts per mil. In addition, heat-aging at elevated temperatures of the order of 200° C. did not cause any crazing of the resinous surface. To obtain similar results with the same resin in the absence of the cure accelerator required heating for 48 hours at 200° C.

Example 2

When pure benzyl trimethyl ammonium butoxide [$C_6H_5CH_2(CH_3)_3N$—O—$C_4H_9$] was added in an amount equal to about 0.5 per cent, by weight, of the resin described in Example 1, a surface which was tack-free when hot was obtained by baking glass tapes dipped in this resin for 1 hour at 95° C. About 0.1 per cent, by weight, of the benzyl trimethyl ammonium butoxide added to a resin prepared by hydrolyzing a mixture consisting, by weight, of 69 per cent methyltrichlorosilane, 8 per cent phenyltrichlorosilane, and 23 per cent dimethyldichlorosilane caused curing to the infusible, insoluble, state of films of said resin in 1 hour at 95° C. No apparent viscosity change occurred in a sample of the aforementioned resin containing 0.1 per cent of benzyl trimethyl ammonium butoxide even after standing at room temperature for three months.

Example 3

When 3-mil glass tape was impregnated with the methyl phenyl polysiloxane resin prepared in Example 1 and containing 0.5 per cent, by weight, tetraethyl ammonium hydroxide, and thereafter baked for 3 hours at 115° C., it was found that the tape had a dielectric strength of 1250 volts per mil. Heat-aging of the coated tape for 41 hours at 300° C. did not effect any change in the properties of the resin or decomposition thereof. This showed that the cure accelerator did not act as an aging catalyst as usual cure accelerators do.

Example 4

In this example, tetraethyl ammonium acetate and tetraethyl ammonium formate were mixed in different proportions with the methyl phenyl polysiloxane resin solution prepared in accordance with the directions in Example 1. Glass tape was thereafter dipped in the said resin solution and baked for varying times at different temperatures to give the following results:

| Cure Accelerator | Per Cent Cure Accelerator | Time of Heating | Temperature | Remarks |
| --- | --- | --- | --- | --- |
|  |  | Hours | °C. |  |
| Tetraethyl ammonium acetate | 0.5 | 1 | 115 | Tack-free hot. |
| Tetraethyl ammonium formate | 0.25 | ½ | 115 | Do. |

The curing effect of the quaternary ammonium compounds is not limited to either the specific accelerators employed in the foregoing examples or to the particular resin used. Illustrative examples of other cure accelerators embraced by my invention are, for example, tetramethyl ammonium hydroxide, phenyl trimethyl ammonium hydroxide, diethyl dimethyl ammonium hydroxide, tetraphenyl ammonium hydroxide, tetratolyl ammonium hydroxide, etc.; tetramethanol ammonium hydroxide, tetrabutanol ammonium hydroxide, tetra-(2-hydroxy propyl) ammonium hydroxide, etc.; tetraethyl ammonium ethoxide, tetraethanol ammonium ethoxide, etc.; tetrabutanol ammonium formate, tetraethyl ammonium propionate, etc.

Illustrative examples of other polysiloxane resins which may be employed in the practice of the invention are the usual heat-hardenable polysiloxane resins, for instance, the ethyl phenyl, phenyl, tolyl, benzyl, methyl ethyl, etc., polysiloxane resins containing an average of from 1 to 2, preferably from 1.3 to 1.8, total hydrocarbon groups (alkyl, aryl, alkaryl, and aralkyl groups) per silicon atom.

In addition to the use of the resins for coating and impregnating purposes, it will be apparent that resins prepared in accordance with my invention, i. e., containing the particular cure accelerators, may be used with or without fillers or pigments, as other protective and insulating coatings, without solvents as molding compositions, and in the manufacture of laminated products, e. g., laminated sheet or mica products, etc., with conductive fillers as bonded resistors or conductive films, etc. Preferred fillers are the simple, double, or ternary metal titanates, for example, the titanates of magnesium, calcium, barium, strontium, lead, vanadium, etc.

What I claim as new and desire to secure by Letters Patent of the United States is:

1. The method of curing a liquid methyl and phenyl-substituted polysiloxane resin containing an average of from 1.3 to 1.8 total methyl and phenyl groups per silicon atom, which method comprises (1) mixing with the aforementioned resin from 0.05 to 5%, by weight, based on the weight of the resin, of benzyl trimethyl ammonium butoxide, and (2) heating the resulting mixture at a temperature and for a period of time sufficient to convert the said resin to the insoluble, infusible, solid state.

2. The method of curing a liquid hydrocarbon-substituted polysiloxane resin having an average of from 1.3 to 1.8 hydrocarbon groups per silicon atom, which method comprises (1) mixing with the said resin from 0.05 to 5%, by weight, based on the weight of the resin, of benzyl trimethyl ammonium butoxide and (2) heating the resulting mixture at a temperature and for a period of time sufficient to convert the said resin to the insoluble, infusible, solid state.

3. The method of curing a liquid methyl polysiloxane resin containing an average of from 1.3 to 1.8 methyl groups per silicon atom, which method comprises (1) mixing with the aforementioned resin from 0.05 to 5%, by weight, based on the weight of the resin, of benzyl trimethyl ammonium butoxide and (2) heating the resulting mixture at a temperature and for a period of time sufficient to convert the said resin to the insoluble, infusible, solid state.

KENNETH N. MATHES.

REFERENCES CITED

The following references are of record in the file of this patent:

UNITED STATES PATENTS

| Number | Name | Date |
| --- | --- | --- |
| 2,371,068 | Rochow | Mar. 6, 1945 |
| 2,443,353 | Hyde et al. | June 15, 1948 |

FOREIGN PATENTS

| Number | Country | Date |
| --- | --- | --- |
| 583,875 | Great Britain | Jan. 1, 1947 |